United States Patent [19]  [11] 4,130,362
Lill et al. [45] Dec. 19, 1978

[54] APPARATUS FOR DETERMINING STEERING POSITIONS OF THE FRONT WHEELS OF A VEHICLE

[75] Inventors: Melvin H. Lill, San Jose; James L. Wiederrich, Lodi, both of Calif.

[73] Assignee: FMC Corporation, San Jose, Calif.

[21] Appl. No.: 834,637

[22] Filed: Sep. 19, 1977

[51] Int. Cl.² .............................................. G01B 11/26
[52] U.S. Cl. ..................................... 356/152; 33/288; 356/155
[58] Field of Search ....................... 356/152, 154, 155; 33/288

[56] References Cited

U.S. PATENT DOCUMENTS

| 2,496,324 | 2/1950 | Wilson | 356/155 |
| 2,641,957 | 6/1953 | Vandermeer | 356/155 |
| 2,667,805 | 2/1954 | Carr | 356/155 |
| 3,782,831 | 1/1974 | Senften | 356/155 |
| 3,865,492 | 2/1975 | Butler | 356/155 |
| 3,892,042 | 7/1975 | Senften | 356/155 |

FOREIGN PATENT DOCUMENTS 1929291  1/1970  Fed. Rep. of Germany ............. 33/288

Primary Examiner—S. C. Buczinski
Attorney, Agent, or Firm—T. J. McNaughton; R. S. Kelly

[57] ABSTRACT

An electro-optical apparatus for determining, during caster angle measurement procedures, when the front wheels of a vehicle have been turned into a first desired steering position oriented in one rotative direction from a "straight-ahead" position and have thereafter been turned to a second desired steering position oriented in the opposite rotative direction from the "straight-ahead" position. A multiple light beam projector and a photosensitive detector are mounted to a front wheel of the vehicle for rotation therewith, and a reflector is mounted to the rear wheel of the vehicle which is on the same side of the vehicle as the projector and detector. The projector rearwardly projects three directional beam patterns with each pattern consisting of sequentially emitted discrete beams which are projected at unique angles with respect to the plane of the front wheel. One beam pattern lies in a plane generally parallel to that of the front wheel, and the other two beam patterns are equiangularly displaced to each side of the plane of said one beam pattern, such equiangular displacements being equal to the preselected turn angles for making the caster angle measurements. The reflector is oriented parallel to the rear axle of the vehicle to direct a projected beam pattern so as to intersect the detector when the beam pattern is generally parallel to the plane of the rear wheel. The beam patterns generally provide toe angle information for the front wheel, and circuitry is provided for processing the output signals of the photosensitive detector when receiving said one beam pattern to indicate, by means of a particular output signal condition, the desired "straight-ahead" position for the front wheel. By repeating said output signal condition when the front wheel is turned to expose the other beam patterns to the detector, the exact preselected turn angles are readily obtained.

10 Claims, 10 Drawing Figures

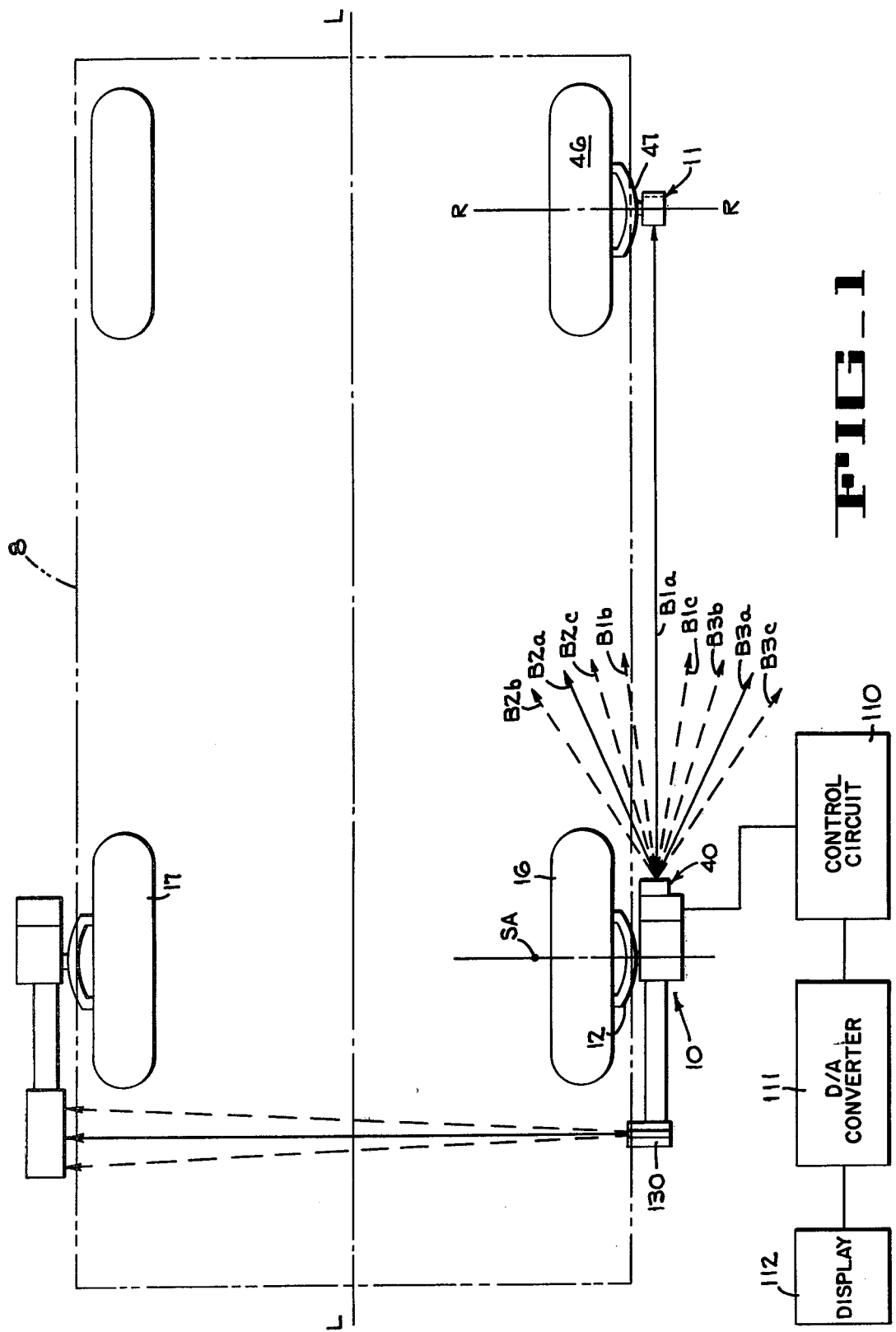

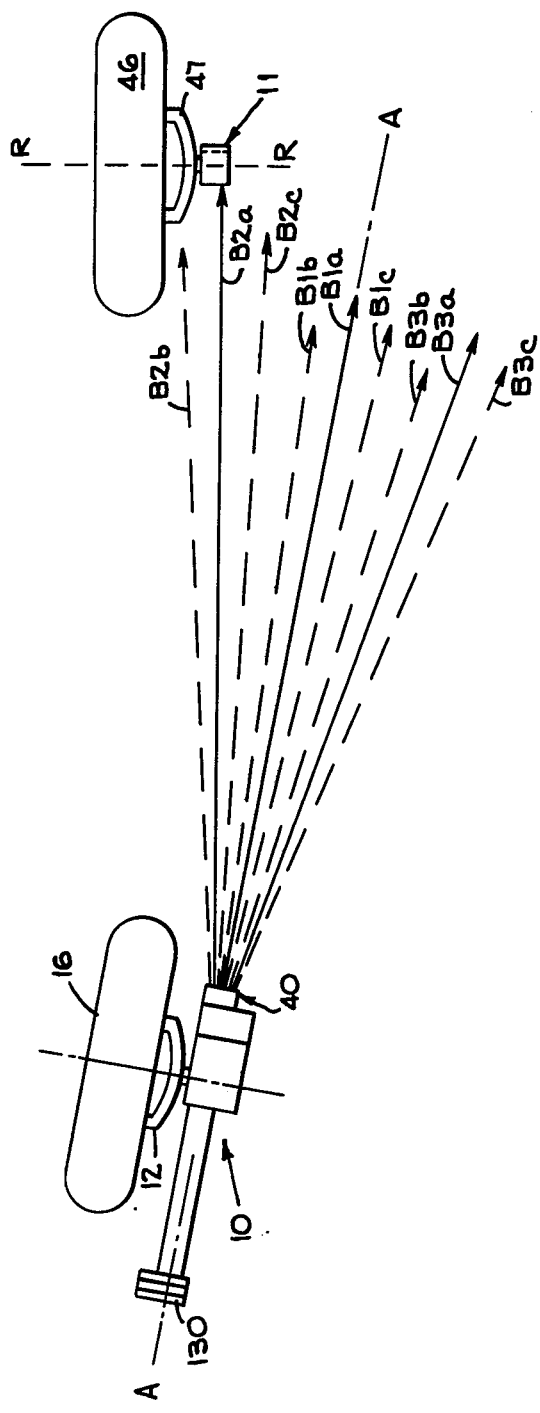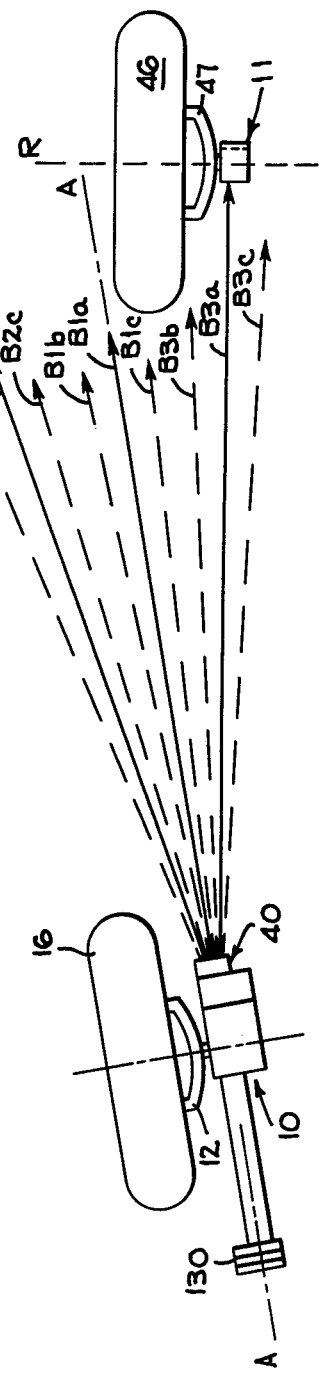

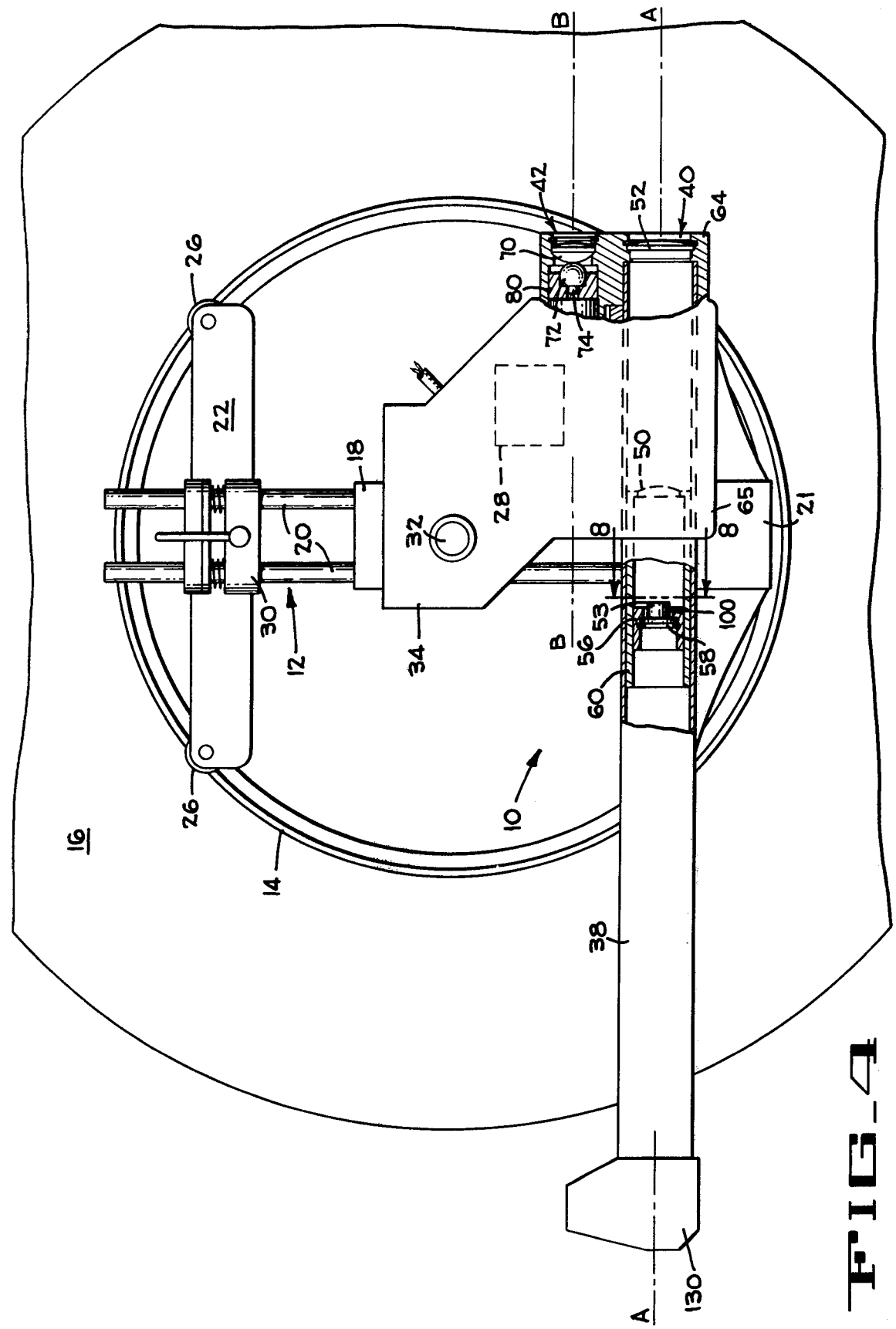
FIG_4

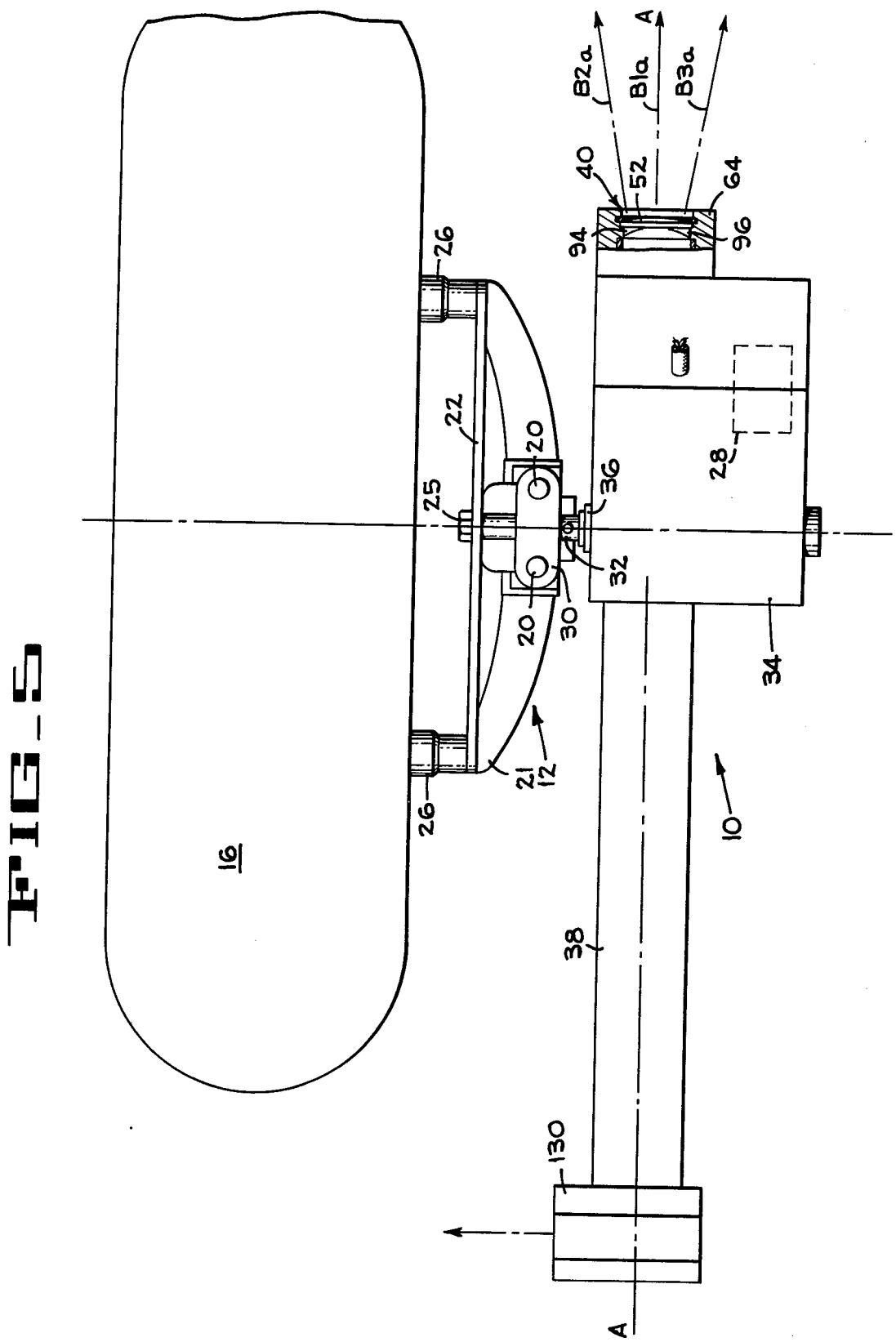
FIG_5

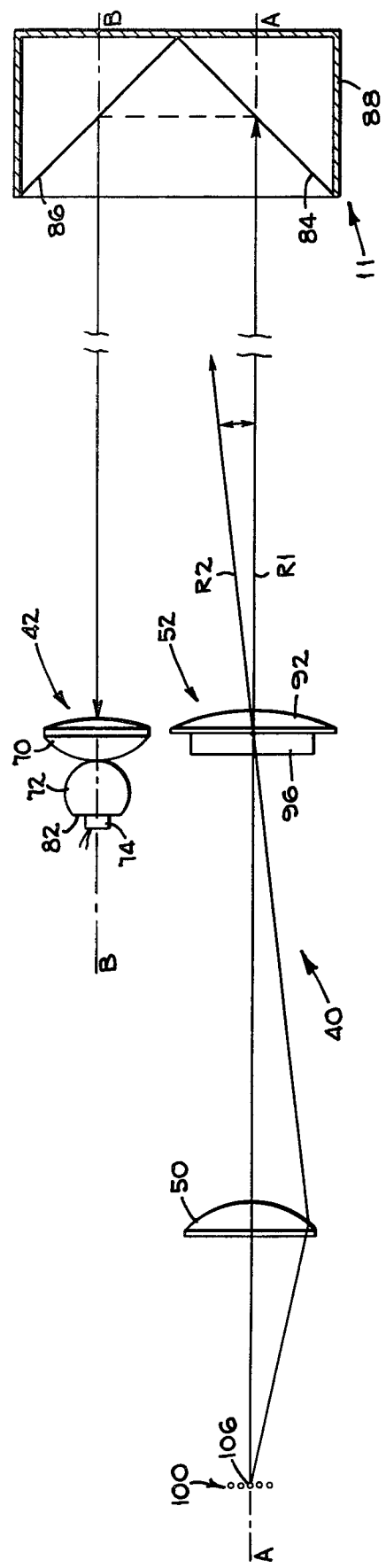
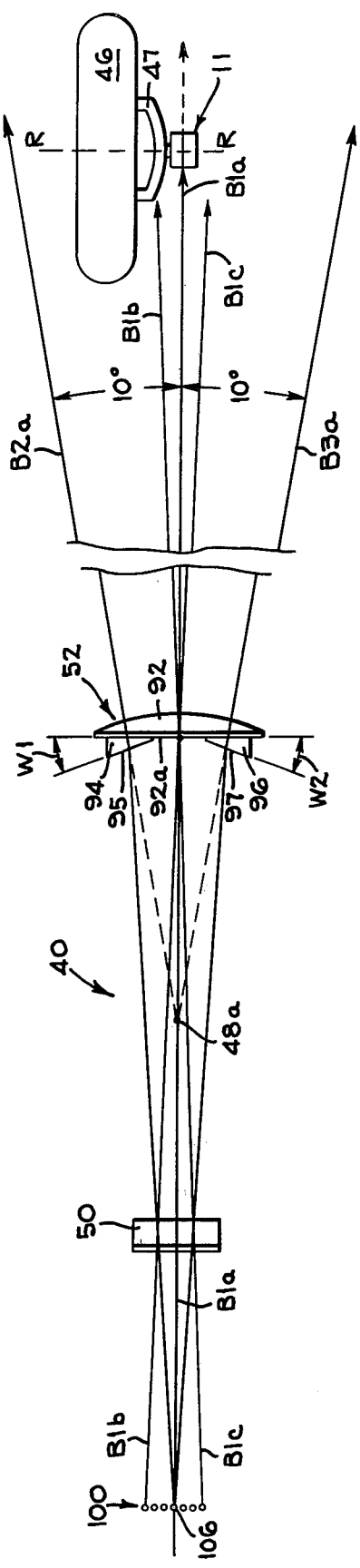
FIG_6
FIG_7

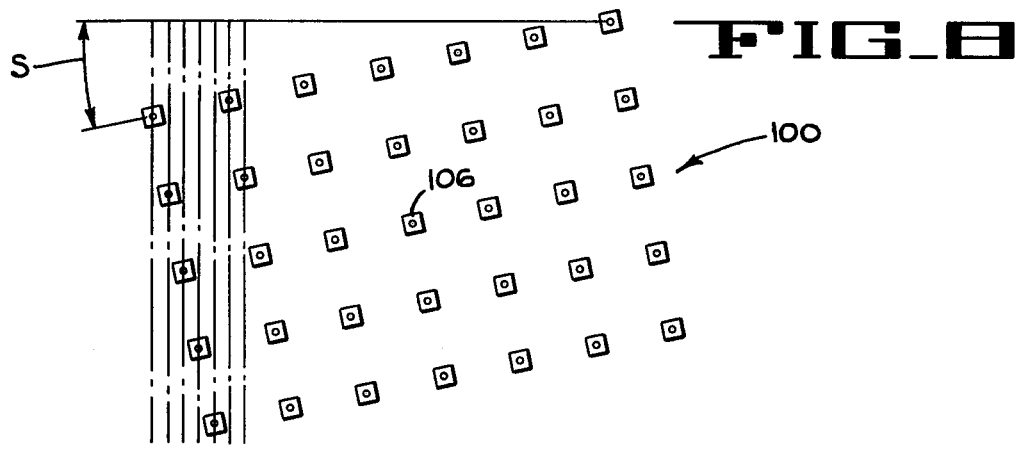
FIG_8
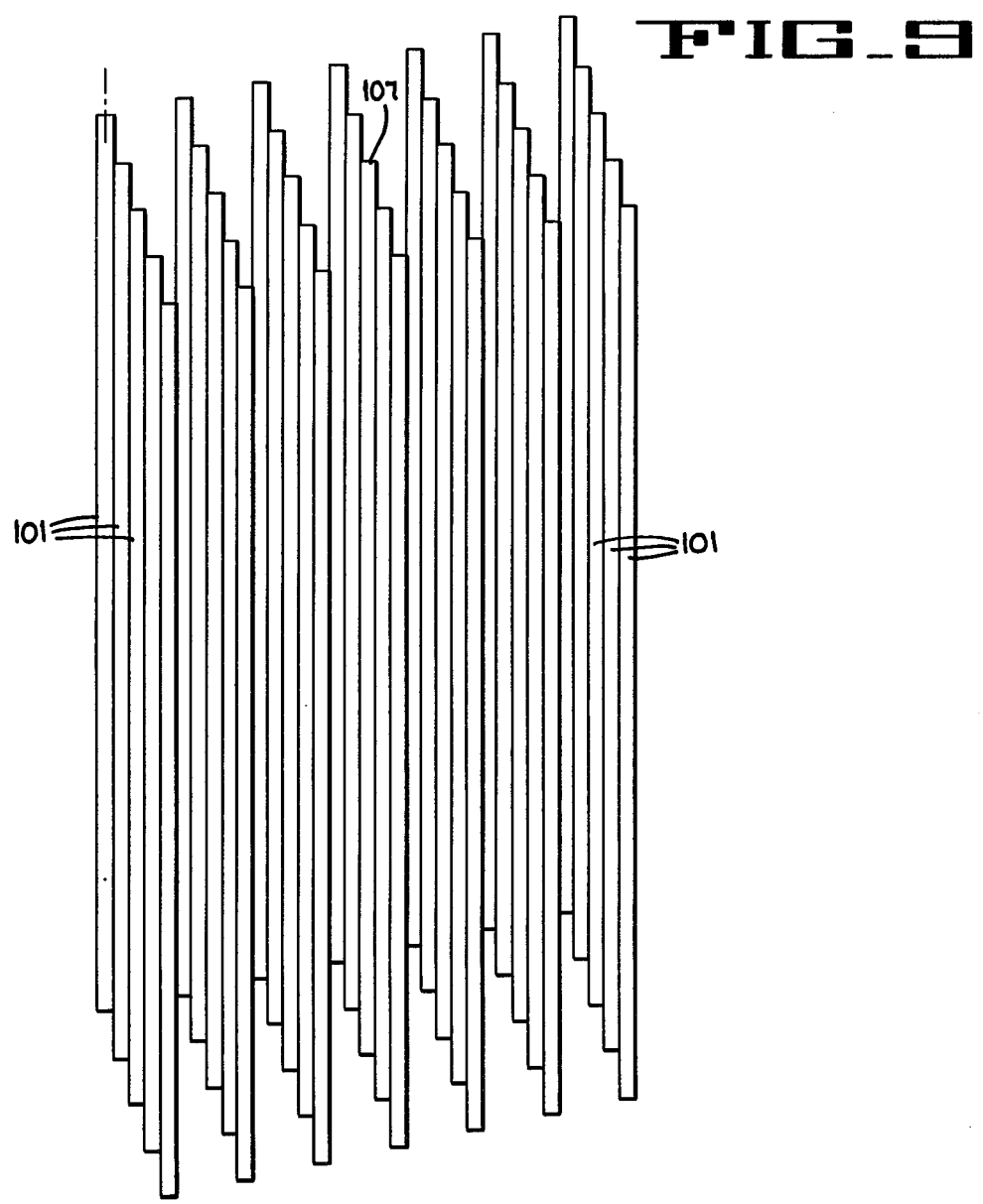
FIG_9

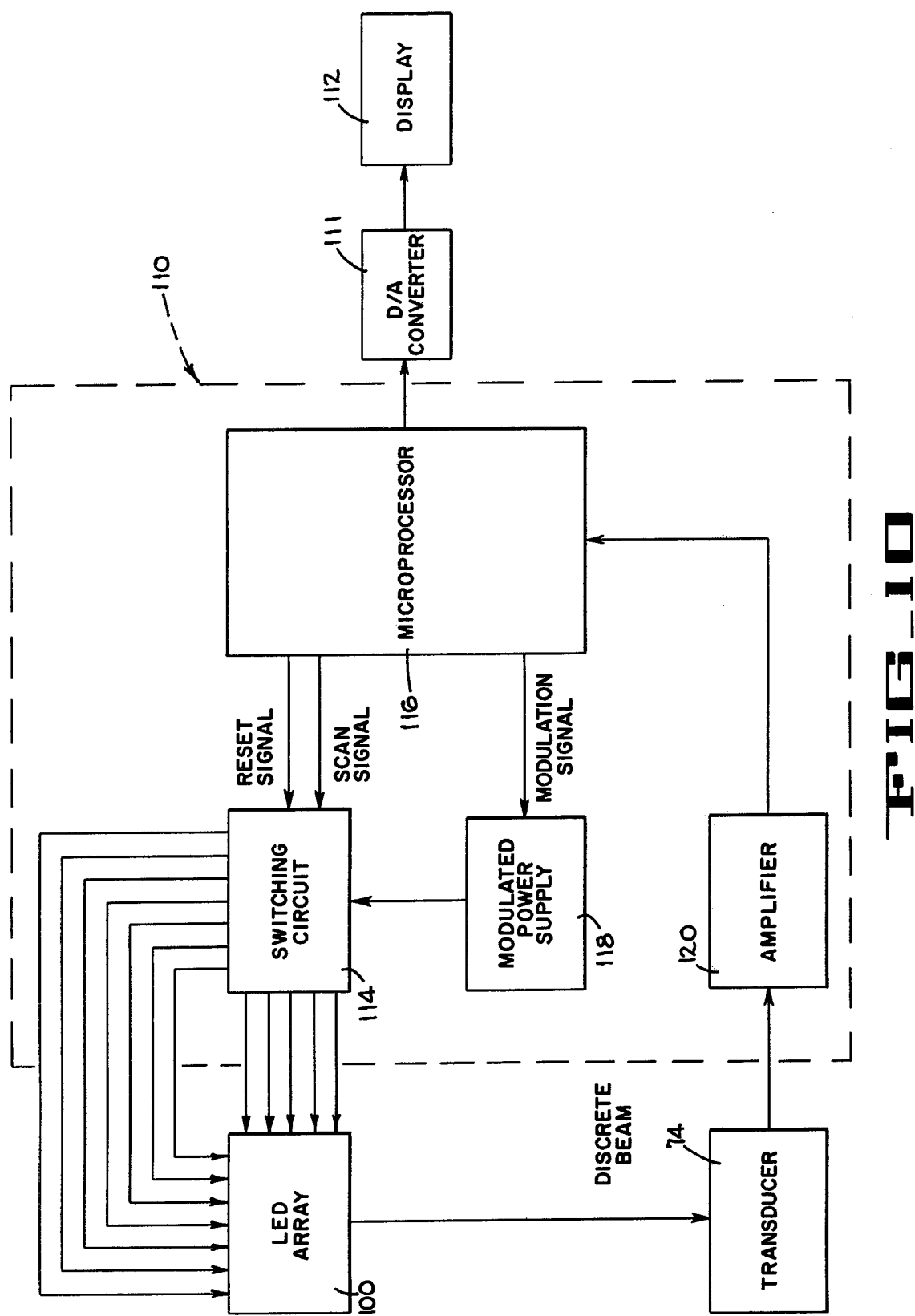

APPARATUS FOR DETERMINING STEERING POSITIONS OF THE FRONT WHEELS OF A VEHICLE

BACKGROUND OF THE INVENTION

1. Field of the Invention

The present invention generally relates to apparatus for determining the rotational position of a body, and more particularly, it concerns an apparatus for determining when the front wheels of a motor vehicle are rotatively oriented in desired steering positions.

2. Description of the Prior Art

It is well-known that proper caster angle settings of the front wheels of a vehicle are requisites to the directional stability of the vehicle. For example, if the front wheels of a car have positive caster angles which are set too high, turning corners will require more effort and front wheel shimmy may occur at slow speeds. If the caster angles are set too low, high speed wander may result. If the caster angle of one of the front wheels is set to an excessively high positive amount relative to the caster of the other front wheel, the car will pull to the side having the least positive setting. In view of the criticality of proper caster angle settings, procedures and equipment have been developed to determine the caster angles of vehicle-mounted wheels.

The basic procedure for determining the caster angle of a front wheel of a vehicle is as follows: first, measuring the camber angle of the wheel after the wheels have been turned to a first steering position rotated in one direction from the straight-ahead position (the straight-ahead position being the position wherein the wheels are arranged such that the vehicle, when driven, will move straight ahead); second, measure the camber angle of the wheel after the wheels have been turned to a second steering position rotated in the opposite direction and angularly displaced by a preselected turn angle, such as 20°, from the first steering position; and third, multiply the difference between the readings by an appropriate factor to determine the caster angle of the wheel. It will be recognized that the accuracy of the caster angle as determined by this procedure is dependent upon both the accurate measurement of the two camber angles of the wheel and the accurate determination of when the wheels are in the two desired steering positions.

In the prior art, a popular apparatus for determining the turn angle of a vehicle-mounted wheel for making caster meausurements has been the turntable upon which the wheel is supported, said turntable having a protractor affixed thereto for indicating the amount of rotation in a horizontal plane of the wheel. A shortcoming of the use of a turntable is that such means fails to automatically establish a reference "zero" position when the front wheels are positioned in the straight-ahead orientation. It is a common practice to align the front wheels in the approximate straight-ahead position by sighting down the sides of the tires of the front wheels supported by the turntables and rotating the front wheels into positions such that they are equally angularly disposed with relation to the positions of the rear wheels directly therebehind. After such approximation of a straight-ahead position is accomplished, the protractor device on one or both of the turntables is adjusted to indicate zero degrees.

A major problem of the turntable is that the protractor thereon is subject to much abuse from contact with vehicle wheels and so must be ruggedly made; thus, it is often not capable of reading the turn angle with sufficient resolution, such as ±1°, necessary for making accurate caster angle measurements.

It will also be recognized that the turntable cannot be utilized when the vehicle is resting on a hydraulic jacking device and the front wheels are thus elevated from the ground.

Alternative devices for determining the steering positions are illustrated in prior U.S. Pat. No. 2,496,324 to Wilson, U.S. Pat. No. 2,641,957 to Vandermeer, and U.S. Pat. No. 2,667,805 to Carr. These patents generally disclose wheel alignment apparatus which include a pair of reflectors respectively mounted to the front wheels of a motor vehicle. Each of the reflectors has a central mirror segment which is parallel to the plane of the associated wheel, a front mirror segment extending forwardly from the central segment and forming a selected angle therewith, and a rear mirror segment extending rearwardly from the central segment and also forming said selected angle with the central segment. All of the mirror segments are planar, and the selected angle at which the front and rear segments are angularly displaced equals the preselected turn angle to the two desired steering positions from the straight-ahead position mentioned hereinbefore in connection with the caster angle determining procedure. The alignment apparatus further includes a pair of targets (or screens) situated in front of the vehicle and a pair of projectors respectively positioned at fixed locations beside the wheel-mounted reflectors. The alignment apparatus still further comprises a pair of stationary mirrors respectively associated with each projector. In operation, a light beam from a projector first strikes one of the mirror segments of the reflector mounted on the wheel, is reflected to the associated stationary mirror, and is then reflected toward the associated target or screen. Three steering positions are determined by this type of system in accordance with the reflective spacial orientation of the segmented reflector. A straight-ahead position is indicated when the beam from the projector strikes the central segment of the wheel-mounted reflector and is reflected to the target. The two steering positions at which the camber angle readings are made according to the aforedescribed caster angle determining procedure are indicated when the beam strikes the front and rear segments of the wheel-mounted reflector and is similarly reflected to the target.

SUMMARY OF THE INVENTION

It is the primary object of the present invention to provide an apparatus for determining the steering positions of a vehicle-mounted wheel for making caster wheel alignment measurements which apparatus provides accurate measurements and yet can be readily operated by mechanics in the field with little training or experience.

According to the present invention an apparatus for determining the two steering positions of the front wheels of a vehicle includes a light beam projector mounted to one of the front wheels for rotation therewith and a detector spaced from the projector with appropriate optical means being provided to insure that the beams from the projector are received by said detector, said detector preferably also being mounted upon one of said front wheels. The projector concurrently generates a first reference beam or pattern of beams along a path having a fixed angular position relative to the plane of the wheel to which it is mounted and a second reference beam or pattern of beams along another path at a predetermined angle in the horizontal plane with the path of the first beam and with the beams, or patterns of beams, being substantial duplicates of each other in all respects. The predetermined angle between the two beams corresponds to the total turn angle through which the wheels are to be turned during the caster angle measurement procedure. When the first beam is detected by the detector in a prescribed manner, the wheels will be oriented in the first desired steering position. When, thereafter, the second beam is detected by said detector in the same prescribed manner as said first beam, the wheels will be in the second desired steering position. Thus, it is only necessary to place the beam, or pattern of beams, in identical positions with respect to the detector to move through the desired total turn angle thereby providing a quick and convenient way of aligning the wheels for caster measurement without necessitating the use of protractors or like devices heretofore described.

In a preferred embodiment of the invention, the projector and detector are used in making toe angle measurements, and the aforedescribed first and second beams (or beam patterns) are provided equiangularly disposed from a third beam (or beam pattern) which is used in making the toe measurements and in determining the straight-ahead position of the front wheels prior to making the caster measurement wheel turns. A preferred apparatus arrangement is to have both the detector and projector on the same front wheel wherein the beams are all directed to a mirror on the rear wheel at the same side of the vehicle.

BRIEF DESCRIPTION OF THE DRAWINGS

FIG. 1 is a diagrammatic view in plan illustrating the apparatus of the present invention mounted upon a vehicle and with the front wheels of the vehicle being disposed in a straight-ahead position.

FIGS. 2 and 3 are diagrammatic plan views showing the wheels on one side of the vehicle of FIG. 1 and particularly illustrating the two desired steering positions of the front wheel used in the determination of the caster angle of the wheel.

FIG. 4 is an elevational view illustrating the projector and photodetector assembly of the apparatus of the present invention with the assembly being mounted to one of the front wheels of a vehicle.

FIG. 5 is a top plan view of the projector and photodetector assembly shown in FIG. 4.

FIG. 6 is a diagrammatic elevational view which depicts the optics of the apparatus of the present invention.

FIG. 7 is a diagrammatic plan view similar to FIG. 6 and further illustrating the optics of the apparatus of the present invention.

FIG. 8 is an enlarged diagrammatic view taken generally in the direction of line 8—8 of FIG. 4 and particularly showing the arrangement of the array of light-emitting diodes forming the projector.

FIG. 9 illustrates the light pattern which will be projected by the array of FIG. 8 and received at the target assuming, for illustrative purposes, that all of the diodes in the array are concurrently activated.

FIG. 10 is a schematic diagram of the control circuit of the apparatus of the present invention.

DESCRIPTION OF THE PREFERRED EMBODIMENTS

Referring now more particularly to FIG. 1 of the drawings, it will be seen that the apparatus of the present invention comprises a projector and photodetector assembly 10 mounted by a mounting mechanism 12 to a front wheel 16 of a vehicle 8 and a reflector 11 mounted by a mounting mechanism 47 to the rear wheel 46 of the vehicle directly behind the assembly 10. In the apparatus of the present invention, as disclosed herein, the projector and photodetector assembly 10 is similar to the projector and photodetector assembly shown and described in the co-pending United States patent application of Andrew K. Chang, Ser. No. 834,636, filed on even date herewith, with the specific construction of the light projecting elements and the light detecting elements being the same (except for the projecting lens which forms the basis for the present invention), and such patent application is specifically incorporated herein by reference. It will be understood from the following description that the apparatus of the present invention may utilize various other types of light beam projecting and detecting, toe angle measuring devices, rather than that type shown in the aforementioned co-pending patent application, the specific means for projecting and detecting a beam, or a pattern of beams, being merely illustrative of one such device. Furthermore, while it is highly desirable to have the apparatus of the present invention serve a dual function as a toe angle measuring device and as a means for determining certain steering positions of the front wheels of a vehicle, it is not intended that the present invention be limited to apparatus which also provides toe angle measurements.

As will be hereinafter described in greater detail, the projector and photodector assembly 10 is operatively associated with a control circuit 110 which controls the energization of a multiple-diode light source within the assembly and produces a digital output signal from the photodetector within the assembly. The digital output signal provided by the circuit 110 is converted to an analog signal by a digital-to-analog converter 111, and the analog signal is fed to a display device 112. The device 112 includes a bipolar meter for indicating, in fractions of degrees, the angle of the front wheels 16 and 17 of the vehicle 8 relative to a reference axis.

With reference to FIGS. 4 and 5, it will be seen that the projector and photodetector assembly 10 is mounted by the detachable mounting mechanism 12 to the rim 14 of the front wheel 16. The mounting mechanism 12 may be of the type described in prior U.S. Pat. No. 3,709,451 to E. P. Graham, to which reference may be made for details of the construction. Briefly, the mounting mechanism disclosed therein firmly mounts an alignment tool to the rim of a motor vehicle wheel such that the alignment tool may be oriented parallel to the plane of the rim and, thus, to the plane of the wheel. The mounting mechanism 12 of the present invention, as shown particularly in FIGS. 4 and 5, comprises a supporting bracket offset from the plane of the rim and defined by a pair of spaced parallel rods 20. One end of each rod is rigidly secured through a cross bar 21 (FIG. 4) which has spaced elongated fingers (not shown) connected to its outer ends for clamping onto the rim 14. A clamping device 30 is slidably received on the opposite ends of the rods 20 so that the mounting mechanism can accommodate wheels of different diameters. A clutch mechanism, described in the aforementioned U.S. Pat. No. 3,709,451, may be used to lock the clamping device 30 on the rods 20 in any selected position. A cross bar 22 is pivotally connected at its midpoint to the body of the clamping device 30 by a shouldered screw 25 (FIG. 5). A pair of fingers 26 are secured to the ends of the cross bar 22 and are of sufficient length to maintain the rods 20 in a plane that is disposed outwardly of the wheel rim and is parallel to the plane of the wheel rim when the projecting ends of the fingers are clamped to the rim. The mounting mechanism 12 further includes a supporting slide 18 to which the body of the assembly 10 is pivotally mounted. This is accomplished by means of a stub shaft 32 rigidly attached to the face of the slide 18 and projecting outwardly therefrom at right angles. The slide 18 is set at a selected location along the rods 20 so that the axis of stub shaft 32 exactly coincides with the rotary axis of the wheel upon which the assembly 10 is mounted.

The projector and photodetector assembly 10 comprises a diagonally disposed housing portion 34 rotatably mounted by a bearing bushing 36 (FIG. 5) upon the shaft 32 of the mounting mechanism 12 and a barrel housing portion 38 extending forwardly from the lower end of the housing portion 34. The barrel housing portion 38 and the main housing portion 34 are constructed so as to achieve a weight distribution whereby the assembly 10 will be in balance about the axis of the shaft 32 of the mounting mechanism when the barrel housing porton is horizontally disposed. Accordingly, the barrel housing portion will be generally parallel to both the supporting surface upon which the wheels of the motor vehicle rest and the plane of the wheel 16.

As best seen in FIG. 4, a projector 40 is longitudinally mounted within the bottom of the housing portion 34 and the rearward end of the barrel housing portion 38. As depicted in FIGS. 1-3, the projector 40 concurrently projects three directional beam patterns B1a-c, B2a-c (hereinafter described in detail) rearwardly with respect to the front wheel 16 generally toward the rear wheel 46 of vehicle 8. Each of the directional beam patterns is comprised of a plurality of sequentially emitted, horizontally offset beams. Incorporated into the diagonal housing portion 34 immediately above the projector 40, there is a photodetector 42 which is responsive to light reflected from the reflector 11 mounted to the rear wheel 46 and which thus receives the reflections of the projected beam patterns.

Briefly however, and as best illustrated in the diagrammatic plan view of FIG. 7, the projector 40 includes a plurality of diodes 100, a lens 50 for vertically spreading the light transmitted from the diodes 100 over a selected angle of dispersion, and a projection lens structure 52. The diodes are arranged in the form of an array in a vertical plane as shown in FIG. 8. The array of diodes 100 is affixed to a mounting member 53 (FIG. 4) which is keyed within a bore formed in an annular mounting block 56 with an annular ring 58 being employed to retain the member 53 in the mounting block. The mounting block is secured within a sleeve 60 fitted within the barrel housing portion 38 of the assembly 10. The beam spreading lens 50 is secured within the rearwardly positioned end of the sleeve 60 such that the optical axis A—A (FIG. 4) of the beam spreading lens 50 extends through the center diode 106 (see FIG. 8) of the array 100. The compound lens structure 52, which forms a significant part of the present invention, is retained by a ring within a bore formed in the rear and lower end 64 of the assembly housing portion 34 such that the optical axis of the lens structure 52 is aligned with the axis A—A. In the operation of the projector 40, only one of the LED's is energized at a time to form a beam which is generally centered about the axis A—A but which is spread by the lens 50 over a selected dispersion angle above and below the axis A—A.

The rearmost end of the barrel housing portion 38 is retained within the bore formed in the front and lower end 65 of the diagonal housing portion 34, such bore being coaxial with the bore in which the projection lens structure 52 is received. The sleeve 60 within which the mounting member 56 and the spreading lens 50 are secured is contained within the bore of the tubular housing portion 38, as previously mentioned. This tubular construction facilitates very precise alignment of the components of the projector 40.

It will be understood that the forwardly extending body of the barrel housing portion 38 of the assembly 10 contains a second projector and photodetector for measuring the total toe angle between the two front wheels of the vehicle. Since such device plays no part in the present invention, it will not be described in any detail herein; however, reference to the aforementioned copending patent application of A. K. Chang may be had for the details thereof. It will be noted that the front, or projecting, end of housing 38 includes an enlarged housing portion 130 which directs a beam pattern across the front of the vehicle (see FIG. 1). Housing 130 also contains the photodetector portion of the apparatus for receiving beams from a projector on the opposed front wheel.

As shown in FIG. 4, the photodetector 42 of the apparatus of the present invention is incorporated into the housing portion 34 directly above the beam projector 40. The photodetector includes an objective lens 70 for collecting light reflected from the reflector 11 and a hyper-hemispheric lens 72, which is coaxially aligned with the lens 70, for concentrating light received from the lens 70 on a photosensitive transducer 74. The lens 70 is mounted coaxially within a bore formed in the rear end 64 of the housing 34 above the bore in which the lens structure 52 is mounted. A ring and annular spacer are used to maintain the lens 70 in its respective bore which has an axis B—B (FIG. 4) that is parallel to the axis A—A of the projector 40. The transducer 74 is cemented to the flat surface 82 (see FIG. 6) of the concentrating lens 72, such lens being retained in an annular support block 80 (FIG. 4) maintained within a bore formed within the housing 34 forwardly of and coaxial with the bore receiving lens 70. The transducer 74 is positioned within the annular mounting block 80 so that it is aligned with the axis B—B (FIG. 4), and the lens 72 abuts the lens 70 at a point contact which is as close to coincidence as possible with the optical axis of the lens 70, i.e., axis B—B.

As depicted in FIGS. 6 and 7, the spreading lens 50 is a plano-cylindrical lens having a planar incident face which is normal to the axis A—A (FIG. 4) and a cylindrical emergent face which has an axis of revolution which perpendicularly intersects the axis A—A. As shown in the elevational view of FIG. 6, a first ray R1 from the central LED 106 of the array 100 will be transmitted through the center of the lens 50 and the projection lens 52 without being refracted. A second ray R2 extending downwardly from the LED 106 intersects a lower portion of the spreading lens 50 and is refracted upwardly to intersect the ray R1 at the focal point of the lens, such focal point being located on the rearward flat face 92a (FIG. 7) of the lens structure 52. The ray R2 emerges from the lens structure 52 at an angle such that the light from the LED 106 will be spread vertically by a predetermined amount at the plane of the target, i.e., the face of the photodetector 42. A similar ray from LED 106 (not shown) striking the upper surface of the lens 50 will thus define the vertical extent of the LED image at the target with the target images for all of the LED's being shown in FIG. 9.

The reflector 11 is shown in FIG. 6 to be of the roof type having a lower mirror 84 and an upper mirror 86 contained within a rectangular housing 88. The planar surfaces of the mirrors intersect each other at an angle of 90°. The housing 88 is mounted by the mounting mechanism 47 (similar to the aforedescribed mechanism 12) to the rear wheel 46 such that each of the mirrors 84 and 86 forms an angle of approximately 45° with a vertical plane through the axis of rotation R—R of the rear wheel 46 (FIG. 1). The reflector housing 88 s mounted by the mounting mechanism 47 to the rim of the rear wheel such that the mirrors 84 and 86 are normal to the plane of the wheel and, thus, the longitudinal axis L—L of the vehicle. The reflector 11 is spaced from the vehicle supporting surface such that the projector axis A—A intersects the lower mirror 84 at approximately the midline thereof (see FIG. 6); and the mirrors 84 and 86 are of a size such that the photodetector axis B—B intersects the approximate midline of the upper mirror 86.

With the aforedescribed reflector arrangement, when the axes of rotation of the front and rear wheels are parallel, the central ray R1 from the central diode 106 of the array 100 will be reflected from the lower mirror 84 vertically to the upper mirror 86 and then along the axis B—B to the photodetector 42, as shown in FIG. 6. If the reflector 11 is tilted about the axis of rotation of the rear wheel such that mirrors 84 and 86 are not at 45° angles with a vertical plane through the rear wheel axis, the ray R1 will not strike the midline of the lower mirror and the spacing between the incident and reflected beams will change even though the spacial angle at which the beam is reflected to the photodetector will not change. However, due to the relatively large vertical spread of the beams provided by the lens 50, the apparatus of the present invention is insensitive to relatively large rotational alignment errors of the reflector 11 and/or the assembly 10.

The LED array 100 (as shown in FIG. 8) and the circuitry associated therewith are identical to the LED array and circuitry described in the aforementioned copending United States patent application of A. K. Chang. Briefly, the array comprises a planar, rectangular arrangement of 35 LED's, organized in five lines or rows and seven columns, with the distances between the lines and columns being uniform. The array 100 is skewed relative to a horizontal plane by an angle, S, such that each diode in the array is equally spaced in a horizontal direction from two other diodes in the array whereby the array, when viewed on a horizontal plane, comprises 35 uniformly spaced diodes.

The diodes are arranged to be sequentially lit from one end (in the horizontal plane) to the other with the central diode 106 therefore being lit at the midpoint of such sequence. At the target, i.e., the face of the photodetector 42, the individual diodes produce a series of vertically oriented light bars 101, as shown in FIG. 9, with the light bar from the central diode 106 being shown as the central light bar 107. The height of the light bars 101 is determined by the spreading lens 50 as previously mentioned and the width of the bars is determined by the focus provided by projection lens structure 52. The multiple LED arrangement provides a means wherein the individual toe angle of the front wheel 16 can be determined in accordance with the procedure set forth in the aforementioned copending patent application of A. K. Chang and in accordance with the teachings of a copending United States patent application Ser. No. 773,639 of Melvin H. Lill, filed Mar. 2, 1977—the latter application, which is specifically incorporated by reference herein, showing the procedure wherein the toe angle of a front wheel is determined with respect to a reflector mounted upon the rear wheel. The method of finding the toe angle with the multiple LED's forms no part of the present invention since the particular optical projection and detection system used is unimportant. For convenience, the sequential pattern of 35 beams from the diode array have been generally represented in the Drawings by three beams which, when the assembly 10 is aligned in a plane generally parallel to the axis L—L of the vehicle (i.e., the wheels are in the straight-ahead position) are depicted as beams B1a, B1b and B1c. As shown in the plan view of FIG. 7, the beam B1a represents that beam from the center diode 106 and the beams B1b and B1c represent the beams from the opposite ends of the array which will be horizontally offset at the target from beam B1a.

An important feature of the apparatus of the present invention is the projection lens structure 52 which provides concurrently two other reference beam patterns B2a-B2c and B3a-B3c in addition to the beam pattern B1a-B1c. The beam pattern B1a-B1c forms the central pattern (see FIG. 1) and is projected along a path having a centerline coincident with the axis A—A of the projector 40 and thus along a path parallel to the plane of the front wheel 16. The beam pattern B2a, B2b, B2c, is projected at a selected angle, such as 10°, in one direction in a horizontal plane from the beam pattern B1a-B1c. The third beam pattern B3a-B3c is projected at the same selected angle in the other direction from the central beam pattern B1a-B1c. The beam patterns B2a-B2c and B3a-B3c are thus separated by a total selected angle of 20°. Such total angle is equivalent to the desired turn angle through which the front wheels 16 and 17 are to be traversed between the two desired steering positions associated with the previously described procedure for measuring the caster angles of the wheels. The central beam pattern B1a-B1c is used when the front wheels are in a straight-ahead position and is used in a system for determining the individual toe angle of the front wheels, as described in the aforementioned copending application Ser. No. 773,639.

With reference to FIGS. 6 and 7, the lens structure 52, which produces the multiple beam patterns, includes a plano-convex projection lens 92 having a curvature and index of refraction adapted to focus the light incident thereon at a predetermined focal distance calculated according to the distance from the lens 92 to the reflector 11 and back to lens 70 of the detector 42. Since this distance will vary depending on the size of vehicle, the focal length of lens 92 is determined for the longest vehicle (i.e., longest distance between front and rear wheel) to be aligned with the apparatus of the present invention. The lens structure 52 further includes a pair of wedge-shaped, vertically oriented prisms 94 and 96 spaced uniformly to either side of the central portion of the lens 92 in the horizontal plane (FIG. 7). The prisms 94 and 96 are parallel to each other and their opposing inner edges are uniformly spaced from a vertical plane through the axes A—A and B—B of the projector 40 and photodetector 42. As shown in FIG. 7, the central beam B1a of the central beam pattern is formed from the light from the central diode 106 of the array 100 which is incident upon the center of the lens structure 52. The prisms 94 and 96, which have a deviating power of 10°, are adapted to deflect the light beams from the light source (diode 106) which are incident thereon to thereby form the beams B2a and B3a identical to the beam B1a except that they are deflected 10° from beam B1a about an apparent source 48a which (as shown in FIG. 7) is located forwardly of the source (diode 106) of the beam B1a. Each prism thus serves to increase the angle of deflection of the light beams which are received thereon from the central beam (B1a) emanating from the light source.

The wedge angles W1 and W2 of the incident faces 95 and 97 of the prisms 94 and 96, respectively, are generally equal, but these angles may be slightly different if necessary in order to compensate for minor translational errors associated with the fact that when the wheel 16 is rotated it pivots about an axis SA (FIG. 1) which is not on the centerline of the projector 40. In addition, incident faces 95 and 97 of the prisms, although shown as being flat, may be slightly concave to compensate for the increased total thickness of glass due to the addition of the prism on the surface of the lens 92 which cooperates to obtain the ultimate 10° beam deflection. The inner edges of the prisms 94 and 96 (FIG. 7) also act as a mask to determine the aperture width of the central portion of the projection lens 92 and thereby determine the depth of focus of the light bars 101 (see FIG. 9) at the target plane of the detector which may not be at the ideal image plane of the projector.

The number of discrete beam images 107 of a particular beam pattern that sequentially strike the face of the detector 42 at one steering position of the front wheel 16 will depend upon the focusing power of lens structure 52 and the aperture width of lens structure 52 as defined by the inner edges of the prisms 94 and 96. The discrete beams which are projected in a horizontal pattern as shown in FIG. 9 may actually overlap each other although each discrete beam will be projected at a unique angle with respect to the center-line of the beam pattern.

The control circuit 110, shown in FIG. 10, is operatively connected to the light-sensitive transducer 74 and to each of the LEDs in the array 100. The signals produced by the light-sensitive transducer 74 are used to ascertain the angular position of the wheel 16 relative to the desired steering position into which the wheel is to be turned, e.g., straight-ahead, 10° left, or 10° right. Also, such signals are used to provide an indication of the toe angle of the front wheel when the wheel is generally in the straight-ahead position, the circuitry for performing this function being fully disclosed in the aforementioned copending application of A. K. Chang. As illustrated in FIG. 10 and described in detail in the aforenoted Chang et al. patent application, the circuit 110 includes a switching circuit 114 for sequentially energizing the LEDs of the array 100. The circuitry includes a set of five transistors (not shown) for controlling the application of power to the five rows of the array 100 and a separate set of seven transistors (also not shown) for controlling the application of power to the seven columns of the array 100. During the operation of the switching circuit 114, one and only one transistor of the set of five transistors and one and only one of the set of seven transistors are simultaneously energized, and therefore only one LED of the array will be energized at any given time. To achieve this result, the circuit 114 includes two counters (not shown) respectively associated with the two sets of transistors. Each counter is stepped in a synchronized manner to cause the LEDs to be energized starting at the top of the left-most column (FIG. 8) sequentially to the bottom thereof, then to the top of the adjacent column and to the bottom thereof, and so forth until the bottom LED in the right-most column is energized. Thereafter, this sequential energization is repeated. The synchronization and resetting of the two counters are controlled by a scan signal and a reset signal issued from a microprocessor 116 the details of which are provided in the aforementioned copending application of A. K. Chang.

A high frequency modulated power supply 118 is connected to the aforementioned transistors to cause the light emitted by the LEDs of the array to pulsate at the high frequency of the power supply. The output signals from the transducer 74 can thereby be filtered to eliminate the effects of concurrent reception of ambient light by the transducer. The high frequency modulation of the power supply 118 is controlled by a modulation signal provided by the microprocessor 116. When the modulated light from one of the LEDs of the array 100 is concentrated on the face of the transducer 74 by the lenses of the photodetector 42, the transducer produces a modulated output signal which is received by an amplifier 120 which includes a resonant circuit tuned to the modulation frequency to thereby filter the transducer output signal and hence eliminate the effects of concurrently received ambient light. The output signal of the amplifier 120 is then applied to the microprocessor 116, and the microprocessor derives therefrom a digital output signal which is indicative of the angle between the plane of the assembly 10 and a plane at right angles to the reflector 11, i.e., the toe angle of wheel 16.

The digital output signal of the microprocessor 116, as briefly noted hereinbefore, is fed to a digital-to-analog converter 111, and the analog output of the digital-to-analog converter 111 is applied to the display device 112. The display device includes a bipolar meter which displays the direction and amount of angular displacement of the front wheels 16 and 17 from a desired rotative position of straight-ahead or, in the case of the beam patterns B2a–B2c and B3a–B3c, 10° left or 10° right, respectively.

The operation of the aforedescribed apparatus of the present invention will now be briefly described. The operator mounts the alignment assembly 10 to the rim of the left front wheel 16 by the use of the mounting mechanism 12. The mounting mechanism 47 carrying reflector 11 is attached to the rim of the rear wheel 46. The control circuitry 110 is then turned on and, preferably, a switch for this purpose is included in the assembly 10. Procedures may then be carried out to correct for run-out errors in the wheels, such procedures being well known to those skilled in the art.

The operator then turns the wheels 16 and 17 to a straight-ahead direction where the central beam pattern (including beams B1a, B1b, and B1c) is detected by the photodetector 42. The display 112 will then indicate the amount and direction of angular displacement (toe angle) of the front wheel 16 from the straight-ahead direction where the plane of the front wheel 16 is parallel to the plane of the rear wheel 46 and thus to the longitudinal axis L—L of the vehicle. Camber readings may also be taken at this time by a camber reading inclinometer 28 provided for this purpose in the body of the assembly 10, such inclinometers being entirely conventional and forming no part of the present invention.

Next, the wheel 16 is turned sufficiently to bring a discrete beam of the beam pattern B2a, B2b, B2c into reception by the photodetector 42, as shown in FIG. 2. The display device will then indicate the amount by which the wheel must be turned to bring the displayed reading to zero, at which rotative position of the wheel the central beam B2a will be parallel to the plane of the rear wheel and thus to the longitudinal centerline of the vehicle, as specifically depicted in FIG. 2. The operator then measures the camber angle of the wheel 16 at such position. The wheel 16 is next rotated from such rotative position through the straight-ahead position to the steering position associated with the beam pattern B3a, B3b, B3c. The wheels are first quickly turned until the meter responds to such beam pattern. Then the wheel 16 is carefully turned to bring the meter of the display 112 to read zero. At this point the central discrete beam B3a of the beam pattern will, as shown in FIG. 3, be parallel to the longitudinal axis L—L of the vehicle. The camber angle of the wheel 16 is again measured at such position. Then, the caster angle of the wheel 16 is determined (preferably automatically by the microprocessor 116) by multiplying the difference of the two camber readings at the 10° rotative positions by a predetermined factor. Adjustment of the caster angle then may be made in the conventional manner if necessary.

As indicated above, the apparatus of the present invention may be readily incorporated into an alignment system for measuring the toe angles of the front wheels of a vehicle of the type shown, for example, in the aforementioned copending application Ser. No. 773,639 of Melvin H. Lill. The microprocessor 116 may be programmed generally in accordance with the teachings of the aforementioned copending patent application Ser. No. 773,639 to supply toe angle information for both front wheels of the vehicle. The display device 112 would then be used for indicating the individual toe angles of the front wheels of the vehicle.

Although the best mode contemplated for carrying out the present invention has been shown and described herein, it will be apparent that modification and variation may be made without departing from what is regarded to be the subject matter of the invention.

What is claimed is:

1. An apparatus for determining when the front wheels of a motor vehicle are in a first steering position oriented in one direction from a straight-ahead position and are thereafter in a second steering position oriented in the opposite direction from the straight-ahead position and angularly displaced by a preselected turn angle from said first steering position, said apparatus comprising: means mounted to one of the front wheels for projecting a first directional light beam at a fixed orientation relative to the plane of said one front wheel and for concurrently projecting a second directional light beam at a fixed angle in a horizontal plane with respect to said first beam, with the angle between said first and second beams corresponding to said preselected turn angle; and detecting means optically spaced from said projecting means and oriented in a preselected manner relative to said projecting means for detecting said first directional beam to thereby determine that said one wheel is oriented in said first steering position and for subsequently detecting said second directional beam after the front wheels have been rotated through said preselected turn angle to thereby determine when said front wheels have been turned by the precise amount required for said turn angle from said first steering position to said second steering position.

2. The apparatus according to claim 1 wherein said means for projecting said beams includes a light source, a projection lens having an optical axis extending through said light source, a first prism mounted adjacent said projection lens and at one side of the optical axis of the projection lens to deflect light from said light source at a first selected deflection angle with respect to said optical axis of the projection lens and with the light deflected by said first prism comprising said first directional beam, and a second prism mounted adjacent said projection lens and at the opposite side of the optical axis of the projection lens from the first prism to deflect light from said light source at a second selected angle with respect to said optical axis of the projection lens and with the light deflected by said second prism comprising said second directional beam.

3. The apparatus according to claim 2 wherein said first and second prisms are mounted adjacent said projection lens on a planar side thereof which faces said light source.

4. The apparatus according to claim 1 wherein said detecting means is mounted on one of said front wheels.

5. The apparatus according to claim 4 wherein said detecting means is located on the same front wheel as said projecting means, said projecting means and said detecting means being aligned in a vertical plane.

6. The apparatus according to claim 1 wherein said projecting means directs said beams generally toward a rear wheel of the vehicle; and said detecting means comprises light-sensitive means for producing a signal indicating reception of either of said directional beams, said light-sensitive means being mounted to the front wheel which mounts said projecting means and whose relative rotative position is to be determined, means mounted to said rear wheel of the vehicle for reflecting said directional light beams to impinge upon said light-sensitive means, and means responsive to said signal for indicating when one of said directional light beams is directed from said reflecting means to said light-sensitive means.

7. The apparatus according to claim 1 wherein said means for projecting said first and second directional beams further includes means for projecting a third directional light beam, with said first beam being projected along a path forming a fixed angle with the plane of said front wheel, said third beam being projected along a path which is parallel to the plane of said front wheel, and said second beam being projected along a path forming an angle with the plane of said front wheel which is equal to but in the opposite rotative direction from the fixed angle formed by the path of said first beam with said plane of said front wheel, said detecting means detecting said third directional beam to thereby determine when said front wheel is in said straight-ahead position.

8. The apparatus according to claim 7 wherein said beam projecting means includes a light source and a projection lens having an optical axis extending through said light source, said third directional beam being formed by light incident upon a central portion of said projection lens about said optical axis, a first prism mounted adjacent said projection lens at one side of said optical axis and spaced therefrom for deflecting the light from said light source to form said first directional beam, and a second prism mounted adjacent said projection lens at the other side of said optical axis and spaced therefrom for deflecting the light from said light source to form said second directional beam.

9. The apparatus according to claim 7 wherein said beam detecting means comprises light-sensitive means for producing a signal indicating reception of one of said directional beams, said light-sensitive means being mounted to the front wheel which mounts said projecting means and whose relative rotative position is to be determined, means mounted to said rear wheel of the vehicle for reflecting said directional light beams to impinge upon said light-sensitive means, and means responsive to said signal for indicating when one of said directional light beams is directed from said reflecting means to said light sensitive means.

10. In a wheel aligner of the type in which optical projection apparatus is mounted on a steerable wheel of a vehicle for determining alignment conditions of said wheel, the improvement wherein said apparatus comprises projector means for simultaneously projecting a first beam and a second beam, said first beam being projected at a first angle fixed in relation to the plane of said steerable wheel, said second beam being projected at a selected angle in relation to said first beam in a plane generally normal to the plane of said steerable wheel, and beam receiving means optically spaced from said projector means for sequentially receiving said first and second beams as said wheel is steered through a turn angle equal to said selected angle between said first and second beams.

* * * * *